3,471,560
SYMMETRICAL HALO-SUBSTITUTED AROMATIC DIQUATERNARY AMMONIUM COMPOUNDS
Robert Andrew Bauman, New Brunswick, N.J., assignor to Colgate-Palmolive Company, New York, N.Y., a corporation of Delaware
No Drawing. Filed Feb. 21, 1967, Ser. No. 617,475
Int. Cl. C07c 87/22, 87/46; A61k 5/00
U.S. Cl. 260—567.6     11 Claims

ABSTRACT OF THE DISCLOSURE

Symmetrical, aromatic diquaternary ammonium compounds, said ammonium radicals being separated by at least 6 and up to 20 methylene groups have particular utility as antimicrobial and anticaries agents in pharmaceutically acceptable carriers such as dentifrices. Aforesaid compounds can be prepared by reacting a dihalogenated paraffin with a tertiary amine containing a halogenated benzyl radical or by reacting a halogenated aryl chloride with a diaminoalkane.

---

The present invention relates to a novel class of diquaternary ammonium compounds having particular utility both as anticaries and antimicrobial agents in pharmaceutically acceptable carriers such as dentrifices, mouth washes and the like.

More specifically, this invention relates to a novel class of compounds represented by the general formula:

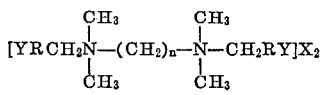

wherein $n$ is an integer from 6 to 20, R is an aryl group derived from an aromatic hydrocarbon, i.e., benzene, napthalene, anthracene, biphenyl, Y is a halogen, i.e., Cl, Br, F, I, and X is a halide, which may be the same or different from Y.

It has been found that the instant symmetrical, aromatic diquaternary ammonium compounds possess unexpecetd anticaries and antimicrobial activity. The wide spacing between the quaternary nitrogen atoms confers increased potency against microorganisms and in vivo activity against caries, which is unusual for aromatic quaternary ammonium compounds. The greater the value of the $n$ integer in the aforesaid class of compounds, the greater the antimicrobial and anticaries activity thereof.

In a series of anticaries tests, when tested for ability to prevent glycolysis (with acid formation) in incubated saliva, compounds having the aforedefined general formula wherein $n$ is 12 to 20 exhibited the greastest effectiveness; where $n$ is 10, they were moderately effective, and where $n$ is 6 to 8, they were ineffective. In the Snyder test which determines the ability to prevent acid formation by lactobacilli in an agar medium, compounds wherein $n$ has a value of 12 to 20 exhibited greatest effectiveness. All the aforesaid compounds are effective odor inhibitors as measured by the Titrilog test, which determines the amount of volatile sulfur components in the mixture of anticaries agent and incubated saliva, said sulfur content being proportional to organoleptic odor values. Thus, it is apparent that the anticaries activity in these in vitro tests varies from low to high, increasing as the spacing between the quaternary nitrogen atoms widens.

The instant novel symmetrical diquaternary ammonium compounds were tested for in vitro antimicrobial activity against a variety of microorganisms, inclusive of gram positive bacteria such as *Staphylococcus aureus, Streptococcus mitis,* Streptococcus strain HS–6, *Corynebacterium acnes, Bacillus subtilis;* gram negative bacteria such as *Escherichia coli, Pseudomonas aeruginosa;* yeast such as *Candida albicans;* fungus such as *Aspergillus niger* and *Trichophyton mentagrophytes.* Compounds where $n$ is 12 to 20 possess considerable activity at low concentrations against most of said microorganisms. Compounds where $n$ is 10 possess some antimicrobial activity at larger concentrations, and compounds where $n$ is 6 to 8 possess little antimicrobial activity at high concentrations. Thus, the degree of antibacterial activity is directly proporional to the value of the $n$ integer, i.e., the number of methylene groups separating the two quaternary nitrogens.

The instant compounds can be prepared by reacting a dihalogenated paraffin or alkane with a tertiary amine containing a halogenated benzyl radical, such as dimethyl chlorobenzylamine, in the presence of a suitable solvent such as methyl, ethyl, propyl alcohol. The reaction product is isolated in any suitable manner, preferably by evaporation of the solvent. The diquaternary ammonium compound may then be purified by washing with ether, acetone, benzene or mixtures thereof, and recrystallized from aqueous acetone.

Another method used in the prepartion of the instant compounds comprises the reaction of a halogenated aryl chloride, such as chlorobenzyl chloride with a diaminoalkane in the presence of a solvent such as methyl, ethyl or propyl alcohol. The reaction product is isolated in a similar manner as aforedescribed.

The following specific examples of symmetrical diquaternary ammonium compounds are merely illustrative and it is understood that the invention is not limited thereto. All amounts in these examples as well as elsewhere throughout the instant specifications and claims, are by weight unless otherwise specified.

EXAMPLE I

Preparation of 1,12-bis(p-chlorobenzyldimethylammonium)dodecane dibromide

A solution of 15 g. of 1,12-dibromododecane and 20 g. (20% excess) of dimethyl-p-chlorobenzylamine in 200 ml. of absolute alcohol was refluxed about 20 hours. At this time argentimetric titration indicated the reaction was 94% complete. The solvent was evaporated in vacuum. The tacky residue was washed with ether and boiling acetone which converted it to a white power weighing 32.5 g. This was recrystallized from aqueous acetone, M.P. 184–186° C. Paper chromatography indicated that it was free of monoquaternary.

*Analysis.*—Calculated for $C_{30}H_{48}Br_2Cl_2N_2$: Carbon, 53.98; hydrogen, 7.25; nitrogen, 4.20%. Found: Carbon, 53.21; hydrogen, 7.06; nitrogen, 4.35%.

Structural formula:

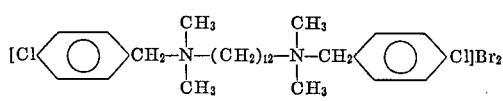

EXAMPLE II

Preparation of 1,10-bis(p-chlorobenzyldimethylammonium)decane dichloride

A solution of 12 g. of p-chlorobenzyl chloride and 7.6 g. of 1,10-bis(dimethylamino)decane in 100 ml. of absolute alcohol was refluxed about 2¼ hours. The reaction proceeded in accordance with the following equation:

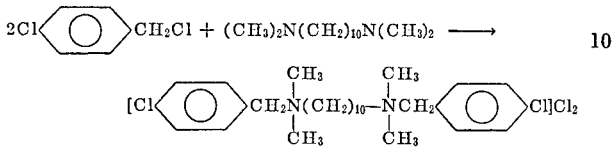

The solvent was evaporated leaving 28.2 g. of white solid. After washing three times with ether and once with acetone 25.4 g. of solid remained. This was recrystallized by heating with 250 ml. of acetone and sufficient water to dissolve. The crystals obtained on refrigeration were washed with cold 8% aqueous acetone and vacuum dried to 14.6 g. of the diquaternary ammonium compound, M.P. 210.5–211.5° C. Paper chromatography showed the absence of monoquaternary.

EXAMPLE III

Preparation of 1,6-bis(p-chlorobenzyldimethylammonium)hexane dibromide

A solution of 2.44 g. of 1,6-dibromohexane and 4.0 g. of dimethyl-p-chlorobenzylamine in 25 ml. of n-propyl alcohol was refluxed about 4½ hours.

The reaction proceeded in accordance with the following equation:

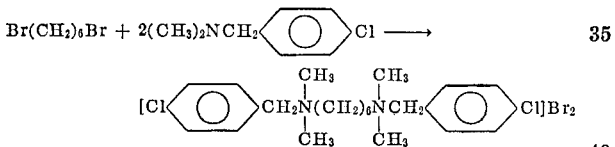

The reaction mixture was poured into 75 ml. of water and extracted with ether three times. Crystallization from the aqueous solution began at room temperature and was completed under refrigeration, M.P. 215–217° C.

EXAMPLE IV

Preparation of 1,8-bis(p-chlorobenzyldimethylammonium) octane dibromide

A solution of 2.7 g. of 1,8-dibromooctane and 4.0 g. of dimethyl-p-chlorobenzylamine in 25 ml. of n-propyl alcohol was refluxed about 3½ hours. The reaction proceeded in accordance with the following equation:

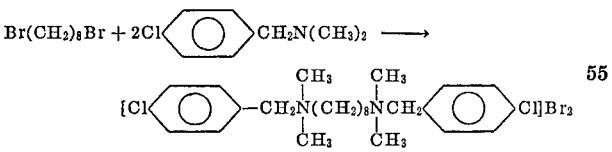

The reaction mixture was poured into water, and ether-extracted to remove unreacted starting materials. The aqueous alcoholic solution was evaporated to dryness and the residue crystallized from 100 ml. of acetone containing 11 ml. of water. The recovery was 3.9 g., M.P. 227–229° C. Paper chromatography indicated absence of monoquaternary.

EXAMPLE V

Preparation of 1,20-bis(p-chlorobenzyldimethylammonium)cosane dibromide

A solution of 0.65 g. of 1,20-dibromoeicosane and 0.25 g. of dimethyl-p-chlorobenzylamine in 10 ml. of absolute ethanol was refluxed for 63 hours, with further additions of 0.25 g. portions of dimethyl-p-chlorobenzylamine after 19 hours and 43 hours. The product was precipitated by dripping the reaction mixture into 150 ml. of ether. The precipitate was collected, dried and recrystallized from acetone containing a small amount of water, M.P. 133–134.5° C.

Analysis.—Calculated for $C_{38}H_{64}Br_2Cl_2N_2$: Carbon, 58.53; hydrogen, 8.28; nitrogen, 3.59%. Found: Carbon, 58.13; hydrogen, 8.46; nitrogen, 3.58%.

Structural formula:

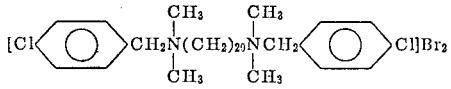

EXAMPLE VI

Preparation of 1,14-bis(p-chlorobenzyldimethylammonium)tetradecane dibromide

A solution of 3.56 g. of 1,14-dibromotetradecane and 2.0 g. of dimethyl-p-chlorobenzylamine in 50 ml. of 95% ethanol was refluxed for 18 hours. After addition of another 2.0 g. portion of the amine, refluxing was continued for 15 hours. The reaction mixture was evaporated in vacuum, and the residue recrystallized from aqueous acetone; M.P. 182–186° C.

Analysis.—Calculated for $C_{32}H_{52}Br_2Cl_2N_2$: Carbon, 55.26; hydrogen, 7.54; nitrogen, 4.03%. Found: Carbon, 55.52; hydrogen, 7.74; nitrogen, 3.77%.

Structural formula:

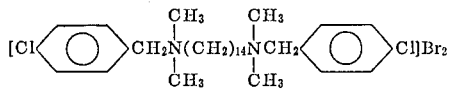

EXAMPLE VII

Preparation of 1,16-bis(p-chlorobenzyldimethylammonium)hexadecane dibromide

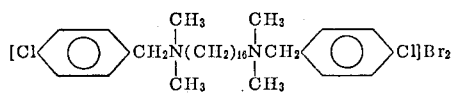

The preparation was carried out as in Example VI, using 3.84 g. of 1,16-dibromohexadecane and two 2.0 g. portions of dimethyl-p-chlorobenzylamine. The crude product, isolated as above, contained some monoquaternary as shown by paper chromatography, but this was eliminated by the recrystallization from aqueous acetone, M.P. 155–160° C.

Analysis.—Calculated for $C_{34}H_{56}Br_2Cl_2N_2$: Carbon, 56.44; hydrogen, 7.80; nitrogen, 3.87%. Found: Carbon, 56.23; hydrogen, 7.88; nitrogen, 3.73%.

It will be apparent to those skilled in the art that variations and modifications of this invention can be made and that equivalents can be substituted therefor.

What is claimed is:

1. Symmetrical diquaternary ammonium compound represented by the formula:

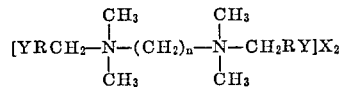

where Y is a halogen, R is an aryl group from an aromatic hydrocarbon selected from the group consisting of benzene, naphthalene, anthracene and biphenyl, n is an integer from 10 to 20, and X is a halide.

2. A compound is accordance with claim 1, where Y is chlorine and X is bromide.

3. A compound in accordance with claim 1, where Y is chlorine and X is chloride.

4. A compound in accordance with claim 1, where Y is bromine and X is chloride.

5. A compound in accordance with claim 1, where Y is bromine and X is bromide.

6. A compound in accordance with claim 1, where R is a phenyl group.

7. 1,10 - bis(p - chlorobenzyldimethylammonium)decane dibromide.

8. 1,12 - bis(p - chlorobenzyldimethylammonium)dodecane dibromide.

9. 1,14 - bis(p-chlorobenzyldimethylammonium)tetradecane bromide.

10. 1,16 - bis(p-chlorobenzyldimethylammonium)hexadecane dibromide.

11. 1,20 - bis(p - chlorobenzyldimethylammonium)cosane dibromide.

References Cited

UNITED STATES PATENTS

| | | | |
|---|---|---|---|
| 2,525,779 | 10/1960 | De Benneville et al. | 260—567.6 |
| 2,933,529 | 4/1960 | Hwa | 260—567.6 |
| 3,055,939 | 9/1962 | Cavallito et al. | 260—567.6 |
| 3,064,039 | 11/1962 | Goldberg et al. | 260—567.6 X |
| 3,064,052 | 11/1962 | Goldberg et al. | 260—567.6 X |
| 3,079,436 | 2/1963 | Hwa | 260—567.6 |
| 3,128,308 | 4/1964 | Doub et al. | 260—567.6 |

CHARLES B. PARKER, Primary Examiner

S. T. LAWRENCE III, Assistant Examiner

U.S. Cl. X.R.

260—570.9; 424—329